United States Patent
Takagi et al.

(10) Patent No.: US 6,367,273 B2
(45) Date of Patent: Apr. 9, 2002

(54) REFRIGERATOR

(75) Inventors: Junichi Takagi, Tochigi-ken; Makoto Ishii, Utsunomiya; Noriaki Arakawa, Tochigi-ken; Takeshi Wakatabe, Sano; Hideki Yoshida, Tochigi-ken; Hideyuki Nakamura, Utsunomiya; Hideo Kumakura, Ashikaga, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/833,556

(22) Filed: Apr. 13, 2001

Related U.S. Application Data (62) Division of application No. 09/335,781, filed on Jun. 18, 1999, now Pat. No. 6,244,061.

(30) Foreign Application Priority Data

| Jun. 18, 1998 | (JP) | 10-170919 |
| Sep. 3, 1998 | (JP) | 10-249295 |
| Oct. 15, 1998 | (JP) | 10-293318 |

(51) Int. Cl.$^7$ .............................................. F25B 49/02
(52) U.S. Cl. ..................... 62/230; 62/228.4; 318/802
(58) Field of Search ................. 62/230, 228.4, 62/228.1, 215, 229; 318/802, 801, 803; 363/40, 41, 42, 43

(56) References Cited

U.S. PATENT DOCUMENTS

| 4,662,185 A | 5/1987 | Kobayashi et al. | |
| 5,375,429 A | * 12/1994 | Tokizaki et al. | 62/230 X |
| 5,483,805 A | 1/1996 | Fujii et al. | |
| 5,588,589 A | 12/1996 | Isihara et al. | |
| 5,929,591 A | * 7/1999 | Katou et al. | 62/209 X |
| 5,970,733 A | 10/1999 | Hamaoka et al. | |
| 6,060,859 A | * 5/2000 | Jonokuchi | 318/801 |

FOREIGN PATENT DOCUMENTS

| JP | 64-2039 | 1/1989 |
| JP | 7-218097 | 8/1995 |
| JP | 7-260309 | 10/1995 |
| WO | 97/13318 | 4/1997 |

\* cited by examiner

Primary Examiner—Harry B. Tanner
(74) Attorney, Agent, or Firm—Antonelli, Terry, Stout & Kraus, LLP (57) ABSTRACT

A refrigerator, having a motor for driving a compressor, an inverter for controlling the operation of the motor, a converter responsive to AC to perform a boosting function to supply DC of variable voltage to the inverter, converter control means for controlling the converter so that a plurality of DC voltages are outputted thereby and inverter control means for controlling the inverter in pulse width modulation each of the plurality of voltages. The lowest voltage among the plurality of voltages being a voltage which turns off the boosting function of the converter.

8 Claims, 9 Drawing Sheets

REFRIGERATOR

CROSS REFERENCE TO RELATED APPLICATION

This is a divisional application of U.S. application Ser. No. 09/335,781, filed Jun. 18, 1999, U.S. Pat. No. 6,244,061 the subject matter of which is incorporated by reference herein.

BACKGROUND OF THE INVENTION

The present invention relates to an inverter refrigerator which has a power circuit for rectifying alternating current to output a desired DC voltage and a motor control circuit for driving a motor.

Hitherto, a control unit for controlling the speed of a compressor motor by providing a rectifier circuit for rectifying AC to convert it into DC and by combining a power circuit, which suppresses higher harmonics of current and which controls the DC voltage, with a driving circuit for driving the compressor motor, has been disclosed in PCTJP 97/13318 (First Document).

The First Document describes a motor control circuit comprising a rectifier circuit and a smoothing circuit for converting AC power to DC, a converter circuit having a chopper circuit for controlling the DC voltage by utilizing an energy storage effect caused by switching operations and a reactor (inductance), a motor driving unit comprising an inverter circuit and a motor connected to the DC side of the converter circuit, an inverter control circuit for controlling the speed of the motor by controlling the switching operations of the inverter circuit, a speed detecting circuit for computing the speed of the motor by detecting the position of the rotor of the motor, a speed control circuit for controlling the speed of the motor via the inverter control circuit by taking in the computed value of speed and a value of a speed command, and a DC voltage control circuit for controlling the DC voltage via the converter control circuit by taking in an output signal of the speed control circuit and effecting control in accordance with the output signal.

The inverter control circuit drives the motor by driving a switching element of the inverter circuit to apply a rotating magnetic field to the motor based on a position signal from the speed detecting circuit and a conduction ratio signal from the speed control circuit. The speed detecting circuit detects the induced voltage of the motor to calculate the position of the rotor and outputs a pulse-like position detection signal. It also calculates the speed from the calculated position signal and outputs it to the speed control circuit as a speed detected value. Then, the speed control circuit calculates the conduction ratio signal of the PWM pulse of the inverter so that a deviation between the speed command from the outside and the speed detected value is zeroed. The speed of the motor is controlled by the inverter circuit, the motor, the speed detecting circuit, the inverter control circuit and the speed control circuit described above.

The converter control circuit drives the switching element of the chopper circuit in accordance with the signal from the DC voltage control circuit. The DC voltage control circuit detects the DC voltage and the output signal of the speed control circuit, e.g., the conduction ratio signal, and controls the DC voltage so as to raise the DC voltage by a predetermined width when the conduction ratio signal reaches a predetermined value, e.g., at the upper limit within a certain range of the conduction ratio, or controls the DC voltage so as to drop the DC voltage by a predetermined width when the conduction ratio signal reaches the lower limit value.

The DC voltage control circuit of the converter is formed by the converter circuit, the converter control circuit and the DC voltage control circuit and operates to control the DC voltage.

Although the motor control unit described in the First Document has not been described with regard to possible use for a refrigerator, one using so-called PAM control means for controlling a DC voltage as a motor control unit for driving a refrigerator compressor has been described in JP-A-7-260309 (Second Document) and JP-A-7-218097 (Third Document).

Although the Second and Third Documents have suggested that energy may be saved by using the PAM inverter as a controller of a motor for driving a compressor of a refrigerator, they have provided so specific proposal for saving energy while performing those functions required by a refrigerator. The structure described in the First Document has not been considered for use in a refrigerator, so that it provides no disclosure concerning energy saving.

The power voltage (AC voltage supplied to house-hold plugs) for driving the motor becomes ±7.5% of the reference value when an allowable variation prescribed by the electric utility law and a voltage drop within a home are taken into consideration. The conventional controller of the motor using a voltage doubling circuit has a difference of voltage in the DC stage of 43 V between the maximum value and the minimum value of 260 V to 303 V, so that there is a situation in which the motor is not activated when the voltage of the DC stage is low.

SUMMARY OF THE INVENTION

It is an object of the present invention to provide a refrigerator which is capable of achieving energy saving while those functions required of a refrigerator are performed.

A second object of the present invention is to provide a refrigerator which allows higher harmonics to be reduced while achieving an energy saving.

A third object of the present invention is to provide a refrigerator whose compressor can be activated even when the voltage of the power supply fluctuates.

The above-mentioned objects may be achieved by a refrigerator comprising a motor for driving a compressor; an inverter for rotating and controlling the motor; and a converter for inputting AC to supply DC of variable voltage to the inverter and having a first operating mode for operating the motor in a speed range which is less than a first rotating speed and a second operating mode for operating the motor with a second speed which is faster than the first rotating speed.

The second object may be achieved by a refrigerator comprising a rectifier circuit for converting AC into DC; a boosting chopper for boosting the DC; a reactor provided between the rectifier circuit and the boosting chopper; an inverter provided behind the boosting chopper for converting DC to AC; a motor which is rotated and controlled by the AC from the inverter and which drives a compressor; boosting chopper control means for controlling the boosting choppers so that the DC inputted to the inverter becomes DC of a plurality of kinds; and inverter control means for controlling the inverter using pulse width modulation at each of the plurality of types of DC voltages. The refrigerator is arranged such that the reactor presents a large inductance in a small current range and a small inductance in a large current range.

The above-mentioned third object may be achieved by a refrigerator comprising a motor for driving a compressor; an inverter for rotating and controlling the motor; and a converter for inputting AC to supply DC of variable voltage to the inverter, and comprising further means for increasing the DC voltage supplied to the inverter relative to the value converted from AC to DC in activating the motor.

The specific nature of the invention, as well as other objects, uses and advantages thereof, will clearly appear from the following description and from the accompanying drawings in which like numerals refer to like parts.

BRIEF DESCRIPTION OF THE DRAWINGS

FIG. 8 is a characteristic diagram showing the efficiency of a control circuit when converter control is turned off and on;

DETAILED DESCRIPTION OF THE INVENTION

A refrigerator is required to have a quick freezing capability for quickly freezing cooked foods for preserving them and storing them, a quick ice-making capability for making ice in a short time and an energy-saving capability for keeping the annual charge for electricity low (reduce annual power consumption) because the refrigerator is used while being constantly plugged into the power source in ordinary homes. While the quick freezing and quick ice-making capabilities may be achieved by increasing the rotating speed of the compressor to increase the amount of refrigerant circulating during the freezing cycle, it is necessary to drive the compressor at low speed to save energy. The following problems occur in trying to achieve both a driving of the compressor at high speed and at low speed.

Presently, a brush-less motor, in which a permanent magnet is embedded in a rotator and the rotator is rotated by causing a stator to generate a rotating magnetic field produced by an inverter, is used often as a motor for operating the compressor of the typical refrigerator (mainly a reciprocating-type). The rotating speed of this brush-less motor may be expressed by the following expression:

$$N' = (V - IR)/k\phi$$

where, (N) denotes the rotating speed of the motor, (V) is the motor applied voltage, (I) is the motor current, (R) is the internal resistance of the motor, (k) is a coefficient, and ($\phi$) is the flux density.

As it is apparent from the above expression, the greater the applied voltage V and the smaller the internal resistance R of the motor, the higher the rotating speed is. While 288 V, which is twice 144 V (about 250 V when a load is connected), of DC voltage inputted to the inverter may be obtained by using a voltage doubling circuit, the internal resistance R of the motor varies depending on whether the specification of the motor is set at a high speed or a low speed.

When the specification is set at a high speed for example, the value of the internal resistance R is reduced by setting the number of turns of the stator of the motor at 120 turns, for example. However, there has been a problem when the specification of the motor is set at the high speed side in that the efficiency of the motor drops remarkably in a low speed range.

Meanwhile, when the number of turns of the coils of the stator is set at 140 turns, for example, to adjust the specification of the motor to the low speed range (to enhance the efficiency in the low speed range), there arose a problem in that the rotating speed necessary for the quick freezing and quick ice-making operations cannot be obtained because the motor applied voltage V is kept constant and the internal resistance R of the motor increases.

Thus, according to the present embodiment, the high speed rotation of the motor has been realized by adjusting the specification of the motor to the low speed range and by increasing the inverter inputted voltage in the high speed range. While the increase of the inverter input voltage, i.e., the DC stage voltage, may be achieved by providing a boosting chopper (or a PWM controllable converter) behind a converter for converting AC to DC and by controlling this boosting chopper in chopping (PAM control), there has been a problem when the boosting chopper is operated over the whole operational range of the motor, as described in the First Document, in that the efficiency of the motor drops in the low speed range where the voltage applied to the motor is low. That is, when the inverter control is performed for the refrigerator, the rotating speed of the compressor motor is driven often at the present minimum rotating speed. In such a case, there has been a problem in that the efficiency of the circuit drops due to switching loss of a power element when an input current is caused to forcibly flow to boost the voltage by a boosting chopper circuit within the converter circuit at this time by the switching operation of the power element and by an energy storage effect of the reactor.

Further, even at the minimum rotating speed, the lowest voltage of the DC voltage must be controlled at 163 V or more including voltage fluctuation when the switching operation of the power element is implemented to boost the DC voltage in the boosting chopper circuit within the converter circuit. Therefore, there has been a problem in that the compressor motor is designated for operation at a point where the DC voltage is high, i.e., it is not designed optimally, thus dropping the efficiency.

This happens because the value of the DC voltage is about 144 V and the lowest DC voltage obtained by boosting it with the lowest conduction ratio is about 163 V in case of full-wave rectification not using a voltage doubling circuit, the pulse width which is the PWM waveform is thinned, the value of the current flowing during the ON period of the inverter increases (the maximum value of the current flowing during the period when a switching element of a certain phase is ON) and the difference with the lowest current in a circulating mode (the period during which current is flowing in a circulating diode in that phase) increases in trying to reduce the rotating speed. This differential current is proportional to the pulsating flux density, and the greater then differential current, the greater the iron loss becomes.

In order to solve this problem, according to the present embodiment, the DC voltage is lowered further by turning off the boosting chopper in the low speed range. The pulse width of the PWM of the inverter may be widened by lowering the voltage of the DC stage. The pulsating flux density may be reduced and the iron loss of the motor may be reduced as a result by thus widening the pulse width because the difference between the maximum current value and the minimum current value in one period of the inverter switching element may be reduced.

In addition, while a lower voltage has been realized by turning off the boosting chopper in the low speed range of the motor to reduce the iron loss of the motor, as described above, there has arisen a problem in that high order higher harmonics contained in the input current are increased by turning off the boosting chopper. Although the current waveform is sinusoidal and higher harmonic components may be reduced in the range in which the boosting chopper is operative by controlling the power factor to almost 1, because the current command is created based on the input AC voltage, the current waveform is determined by the value of the inductance L of the reactor of an LC filter provided in the DC stage between the converter and the inverter in the range in which the boosting chopper is not operative, and a sharp current whose peak value is large and whose width is small flows as the value of L is small and the current waveform becomes sinusoidal as the value of L is large. Then, although the problem of the higher harmonics may be solved by increasing the inductance of the reactor, there arises a problem in that the size of the reactor which allows the higher harmonics to be reduced increases, and it cannot be easily housed in an electric component box provided between a back plate and an inner plate of the refrigerator, for example.

In order to solve this problem, according to the present embodiment, an inductance variable reactor whose inductance increases in the low current range is used. The reactor is constructed so that a loop magnetic circuit is formed by winding a coil around an iron or amorphous material and so that an air gap is provided at part of this magnetic circuit. While the use of a reactor on the DC side of the inverter having an iron core has been describe din JP-B-64-2029 and has an effect of reducing higher harmonics, the greater the current flowing through the reactor, the smaller the inductance becomes in a reactor merely having an iron core. It poses a problem in that the necessary inductance value cannot be obtained over the whole range in which the boosting chopper is turned off and higher harmonics increase in the low speed side in that range.

According to the present embodiment of the invention, the influence caused by the higher harmonics may be minimized over the whole operating range of the motor because the reactor is structured so as to have a gap at a part by forming the iron core and other parts into a ring, and the constant inductance value L is maintained even if the current value increases from the start. Further, as will be described later, while the present embodiment is arranged so as to operate at one speed (lowest speed) when the boosting chopper is turned off, the degree of freedom of design is widened without changing the reactor per machine type within the range because the approximately constant part exists in the inductance value of this reactor even when the lowest speed is different per type of refrigerator.

Figure 1:
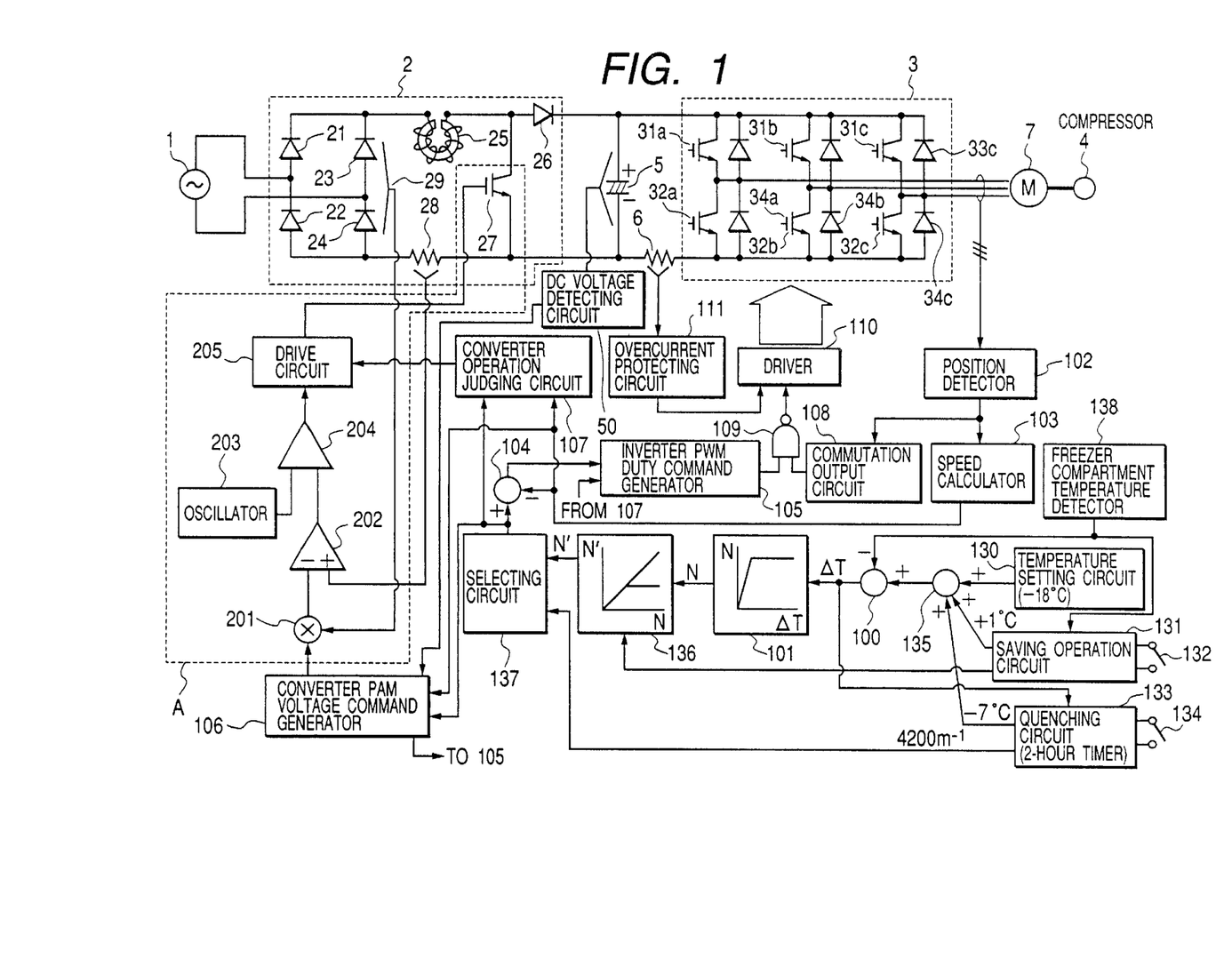
FIG. 1 is a block diagram of a controlling for a refrigerator according to an embodiment of the invention.

One embodiment of the invention described above will be explained below with reference to the drawings. FIG. 1 is a block diagram for explaining of the whole structure of the motor controller comprising the converter circuit using the rectifying circuit and the boosting chopper circuit, the inverter circuit and the compressor motor.

An AC power source 1 is supplied to a plug socket is general and the refrigerator receives electricity by inserting a plug of the refrigerator power cord into the plug socket. The received AC is connected to a converter circuit 2 to be converted into DC. The converter circuit 2 outputs the current as a DC via diodes 21, 22, 23 and 24 composing a rectifier circuit, a rector 25, a diode 26 and a boosting chopper circuit within the converter circuit 2 is connected to the output side of the rectifier circuit in the converter circuit 2 and boosts the voltage by forcibly causing the input current to flow by the switching operation of the transistor 27 and the energy storage effect of the reactor 25, as described above. The boosted DC voltage is supplied to a smoothing capacitor 5 so as to be outputted as a stable DC voltage. While the boosting mechanism is well known, it will be explained briefly. When the diode 21 side is plus and the switching element 27 is ON, the current flows from the AC power source 1, to the diode 21, the reactor 25, the switching element 27, the diode 24 and back to the AC power source 1, and electromagnetic energy is accumulated in the reactor 25. When the switching element 27 is turned off at this time, a current flows through the smoothing capacitor 5 from the reactor 25 via the diode 26 for preventing a reverse current flow and the electromagnetic energy is shifted to the capacitor 5, thus boosting the voltage of the capacitor 5. Thereby, the DC stage voltage is boosted. It is noted that the resistor 28 within the converter circuit 2 is a resistor for detecting current.

An inverter 3 which converts DC to AC and which generates a rotating magnetic field for rotating the motor 7 is connected to the capacitor 5. The inverter 3 is connected with the motor 7 for driving the compressor 4. Although the compressor 4 which is driven by the motor 7 is not shown in detail in the figure, it is mainly a reciprocating-type compressor housed in a closed container together with the motor 7. It may be also a rotary-type compressor.

The inverter 3 is a three-phase inverter in which IGBT (Insulated Gate Bipolar Transistor) devices 31a through 32c are used as switching elements in the present embodiment. Circulating diodes 33a through 34c are connected to those switching elements in parallel, respectively. Then, the rotating speed of the motor 7 is controlled by controlling conduction of the DC supplied from the capacitor 5 in phases of 120 degrees based on the output of the rotating position detector of the motor 7 so that a preset rotating speed is attained and by controlling the conduction ratio (pulse width control) in the conduction period in each phase.

It is noted that a resistor 6 is a resistor for detecting current. The value of this detected current is sent to an over-current protector 111, which outputs a signal for turning off all switching elements in the inverter 3, to a driver 110 when the value of the detected current exceeds a threshold level. Then, the driver 110 turns off the switching elements. This is provided so as not to have a current minor loop in the control of the inverter.

A comparator 100 compares the freezer compartment present temperature, which is indicated by a signal from a temperature obtained from a freezer compartment temperature detector 138 and outputs the temperature deviation before reaching the maximum speed command, the speed command becomes constant when the deviation is greater than that. Meanwhile, the induced voltage of the motor 7 is inputted to a position detector 102 to compute the position of the magnet from this induced voltage and a signal representing the rotating speed of the motor 7 is outputted by a speed calculator 103 based on the position signal. A comparator 104 compares this detected speed with the above-mentioned speed command (in regard to this, a speed command limiter 136 and a selecting circuit 137 will be described later). The deviation of the speed is inputted to an inverter PWM duty commanding device 105, and a pulse train whose pulse width is determined so that the speed deviation is zeroed is generated by proportional-plus-integral computation based on the speed deviation. The output signal of the position detector 102 is also inputted to a commutation output device 108 to output a pulse train which represents a commutation timing of the conduction of 120 degrees of the switching element of each phase (a pulse train which deviates by 120 degrees per each phase) per each switching element (the figure shows one switching element). The switching elements 32*a*, 32*b* and 32*c* composing a lower arm of each phase turn on during this period of commutation timing and ON/OFF operation of the switching elements 31*a*, 31*b* and 31*c* composing the upper arm is controlled via a driver 110 by taking AND logic of the pulse train representing the commutation timing and the pulse train representing the previous PWM signal using an AND circuit 109.

Next, the control of the DC stage voltage of the converter circuit 2 will be explained. The voltage of the DC stage in the present embodiment is controlled in three stages of high voltage (280 V), intermediate voltage (170 V) and low voltage (120 V). The high voltage and the intermediate voltage are realized by controlling ON/OFF operation of the boosting chopper 27. The boosting chopper 27 is turned off to increase the output pulse width of the inverter 3 in the low voltage range, thus, contributing to the energy saving.

The actual rotating speed of the motor 4 computed by the speed calculator 103 and the speed command computed by the speed command generator 101 are inputted to a converter PAM voltage command generator 106 and a converter operation judging device 107. The converter PAM voltage command generator 106 generates a high voltage or intermediate voltage command based on the inputted actual speed and the speed command. The value of this voltage command is compared with the DC voltage across the capacitor 5 detected by the Dc voltage detecting circuit 50 to output a command having a current peak value so that the voltage across the capacitor 5 becomes the selected high voltage or intermediate voltage. When it is judged that the DC stage voltage must be lowered based on the inputted actual speed and the speed command, the converter operation judging device 107 outputs a chopper off signal (PAM off signal) which operates to turn off the boosting chopper (hereinafter the switching element 27 may be referred to as the boosting chopper 27).

A multiplier 201 multiplies the command of the current peak value from the converter PAM voltage command generator 106 with the voltage (pulsating current) detected by the voltage detector 29 and full-wave rectified by the diodes 21, 22, 23 and 24 to output an instantaneous current command. A comparator 202 compares the instantaneous current command with the actual instantaneous current detected by the current detecting resistor 28 and inputs the deviation thereof to a comparator 204 to compare the deviation with a saw-toothed wave (chopping wave) generated by an oscillator 203 to obtain a pulse width modulated signal. This signal is inputted to and amplified by a driving circuit 205 to generate a gate signal of the boosting chopper 27. The phase of the input voltage almost is equal to that of the current and the power factor approaches 1 by effecting control so that the differences between the instantaneous current command and the instantaneous current is eliminated. It is possible to suppress the higher harmonics by forming the current into a sinusoidal wave. It is noted that when a low voltage is required, the chopper off signal which is the output of the converter operation judging device 107, is inputted to the drive circuit 205 to stop the switching operation of the boosting chopper 27 by blocking the gate signal thereof.

Each element surrounded by a dotted line A is packaged in one integrated circuit. It is noted that the output of the converter PAM voltage command generator 106 is the intermediate voltage command during the time when the chopper off signal is outputted and the chopping signal based on the deviation of the instantaneous current is outputted to the drive circuit. At this time, they are formed in the integrated circuit so that the DC stage voltage rises gradually even if the chopper off signal is released (not shown).

Many converter control circuits whose control is circuit-integrated (IC-ed) and which control a DC voltage by controlling an analog voltage have been manufactured recently.

It is noted that, although the voltage command and the value of the actual speed in the embodiment described above, it may be determined by the conduction ratio of the pulse width modulation signal of the inverter.

Figure 2:
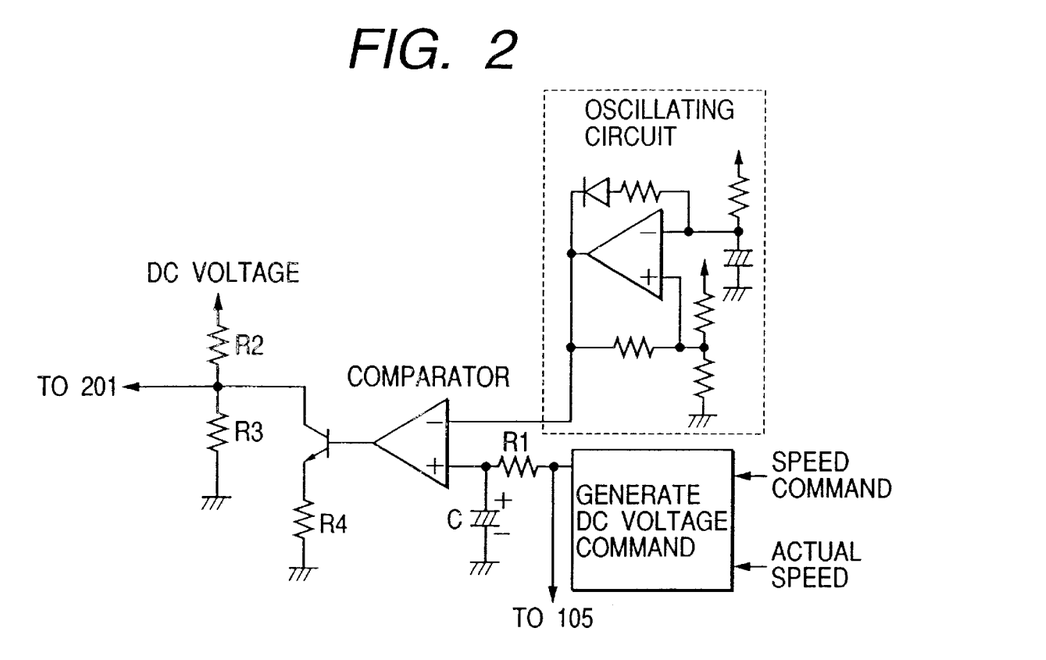
FIG. 2 is a circuit diagram showing the internal structure of a converter PAM voltage command generator.

Next, details of the converter PAM voltage command generator 106 will be explained with reference to FIG. 2. The high voltage or the intermediate voltage is selected by processing a program based on the value of the speed command and the value of the actual speed and a command is outputted in the form of an analog voltage which enables the selected voltage to be generated on the converter control circuit side. That is, a command for changing the DC stage voltage is changed depending on whether the voltage determined by the value is changed depending on whether the voltage determined by the value of a partial potential of the resistors R2 and R3 is outputted or a voltage determined by the volume of the parallel resistance of the resistors R3 and R4, which are connected in parallel, and the value of partial potential of the resistor R2 is outputted.

However, because a large change occurs in the DC voltage at the switching point and the stepwise voltage change causes ill-effects on the PWM duty of the inverter, the present embodiment is arranged such that the change gradually proceeds by an analog circuit even when the voltage command changes by the above-mentioned program processing. This will be explained below.

Figure 4:
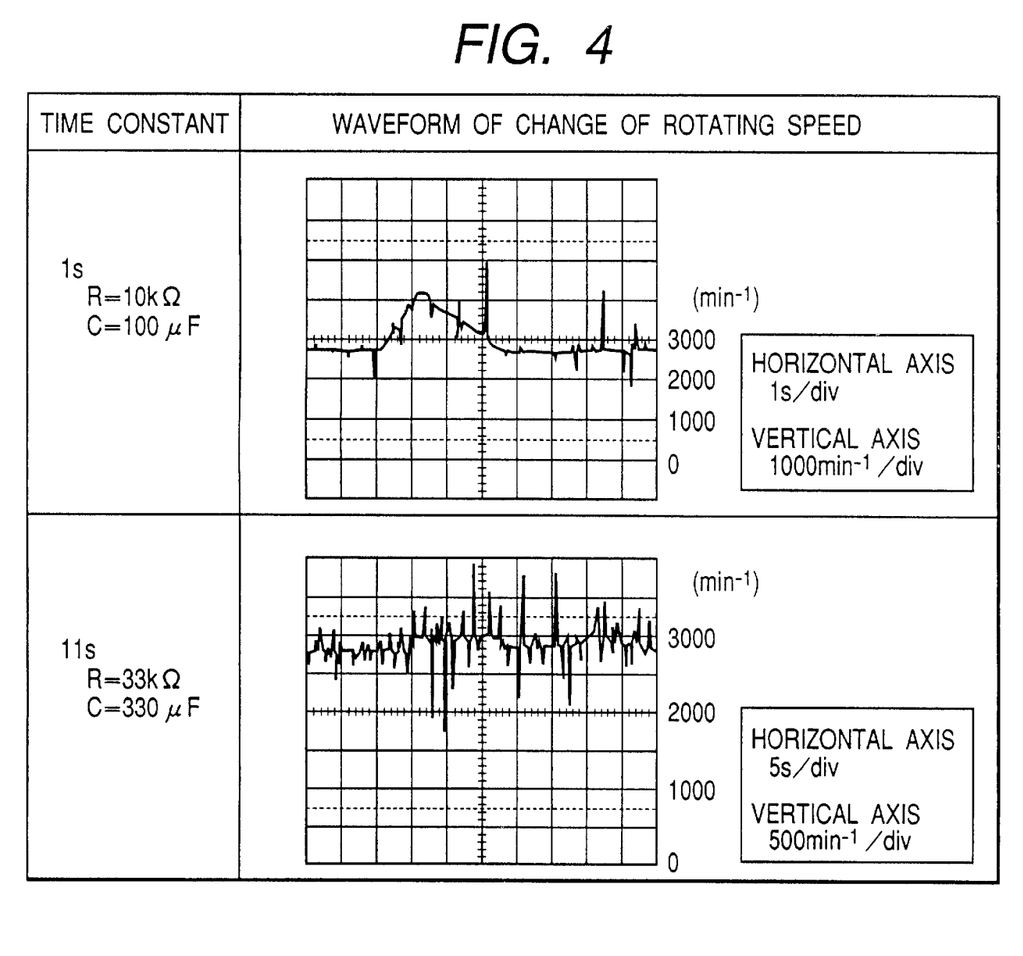
FIG. 4 is a chart showing the time constant change characteristics of the converter PAM voltage command generator.

The DC voltage command outputted by the program processing changes stepwise. Then, the voltage is caused to increase gradually by giving a time constant to the signal changing stepwise using the resistor R1 and a capacitor C. This voltage is compared with a chopping wave formed in the oscillating circuit. The peak value of the output waveform of this oscillating circuit is set to a level below the voltage of the DC voltage command value. Because the output of the comparator is produced when the output of the time constant circuit is large, a pulse train whose width is widened gradually as the output voltage of the time constant circuit gradually increases is outputted. Then, when the capacitor C is completely charged, the comparator outputs a signal ON. When the output of the comparator is ON, the transistor T turns on, so that voltage produced by the value of the parallel resistance of the resistors R3 and R4 and the partial potential of the referred to as the first partial potential) is outputted on the converter control circuit side (the partial potential (hereinafter referred to as the second partial potential) of the resistors R2 and R3 when the transistor T is off). The voltage of the first partial potential and the second partial potential are outputted alternately. The voltage period of the first partial potential is prolonged as the voltage of the time constant circuit rises and the voltage of the first partial potential is outputted in the end. Thus, a rectangular wave having a different duty width corresponding to the time constant is outputted to the converter control circuit side. Although not shown, an integration circuit is provided on the converter control circuit side to convert the rectangular wave into an analog voltage. This output becomes the DC voltage command and the peak value command of the current is obtained by comparing that value with the actual DC voltage. These controls allow the pulsation of the rotating speed of the motor 7 to be suppressed because changes of the voltage in switching the DC voltage may be suppressed. FIG. 4 shows the pulsation of the rotating speed when the time constant of the resistor R1 and the capacitor C is changed. It can be seen that the pulsation of the rotating speed is small when the time constant is large.

It is noted that although the chopping wave is formed and the time constant circuit is formed by the resistor R1 and the capacitor C in the present embodiment, a rectangular wave having a different duty width corresponding to the time constant may be outputted as the DC voltage command to the program (software-wise).

When the voltage of the DC stage changes, e.g., from the intermediate voltage to the high voltage, the peak value of the pulse train outputted from the inverter 3 becomes high and the rotating speed increases sharply as the terminal voltage of the motor 7 increases as a result.

While the voltage of the DC stage is determined software-wise from the value of the speed command and the actual speed within the converter PAM voltage command generator 106 in order to suppress this phenomenon as described above, the command of the DC stage changes stepwise and therefore an analog circuit is provided to weaken this change.

When the command changes stepwise, a speed feedback circuit on the motor control side drops the increased speed to the commanded speed, so that the pulse is thinned to deal with it. However, the speed feedback circuit cannot respond instantly to the quick increase of the motor and the speed of the motor cannot but be increased. Then, when the stepwise change is weakened so as to allow the speed feedback circuit to respond to that, it is undeniable that the actual rotating speed becomes higher than the command value. Although this is not a big problem, there is a problem in that abnormal noise is produced as the rotating speed changes.

Then, according to the present embodiment, the voltage command of the DC stage is sent from the converter PAM voltage command generator 106 to the inverter PWM duty command generator 105. When the voltage of the DC stage changes in the direction of the increase upon receiving the change of the command, the PWM duty is narrowed down in a range not becoming 0% and it is increased in a range not becoming 100% when the voltage changes in the direction of reduction.

After that, the speed is controlled so as to follow the speed command even in the DC stage voltage which gradually changes. That is, it brings about an effect that the burden on the speed feedback circuit is reduced because the increase/decrease of the duty which the speed feedback circuit must implement with respect to the DC stage voltage changing direction is implemented based on the increase/decrease of the DC voltage command in advance.

Next, the control provided for actuating the compressor (motor) will be explained. The voltage normally transmitted to homes is allowed to have a fluctuation range based on the applicable electric utility law. It then has a fluctuation width of 281±7.5% (260 V to 303 V) in the double voltage representation when a voltage drop due to interior wiring is taken into consideration. Therefore, there is a case when it becomes difficult to start the motor as its rotating torque is insufficient when the voltage is low because the starting torque of the compressor is also large. Thus, the present embodiment is arranged such that the DC voltage command is controlled to the high voltage level or the intermediate voltage level at first to obtain a DC voltage which fluctuates less and the activation of the motor is started during eh time when the compressor is stopped or when the starting command is issued. Thereby, the stable DC voltage of 281±3% is supplied, thus, starting the motor reliably.

Figure 9:
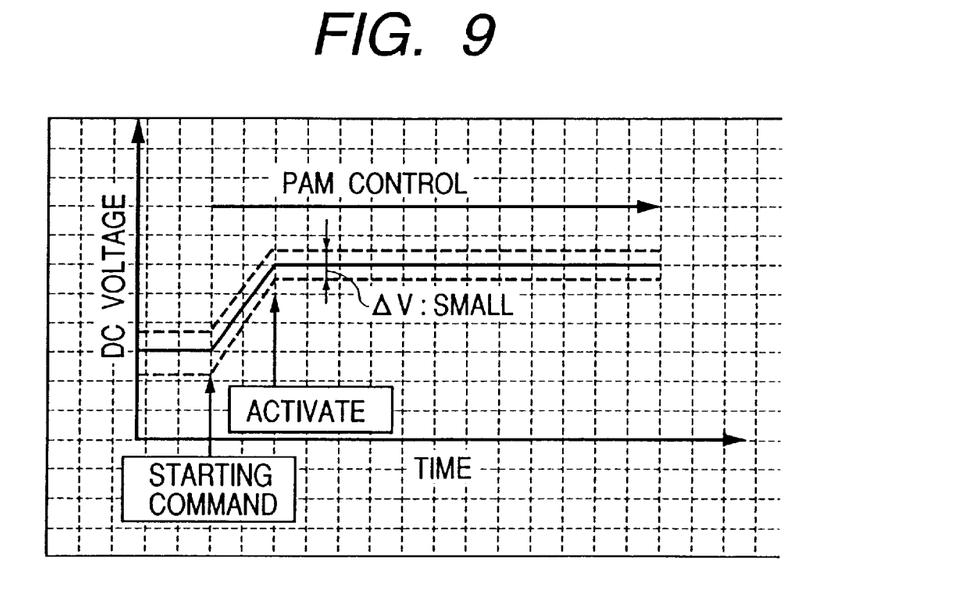
FIG. 9 is a graph showing the transition of the DC voltage in activating the motor.

That is, the converter PAM voltage command generator 106 takes in the actual speed, which is represented by the output of the speed calculator 103 and the speed command which is represented by the output of the selecting circuit 137, and when the actual speed is 0 and the speed command is issued, it judges that the compressor is to be started and sets the DC voltage command as the high voltage command. Then, the inverter causes the switching operation to start the motor under this voltage as shown in FIG. 9. After that, when the freezer temperature approaches the temperature present value, the converter PAM voltage command generator 106 commands the low voltage via the intermediate voltage to drive the motor under the low voltage condition. At this time, the DC voltage fluctuates due to the fluctuation of the power supply voltage as described before because switching in the boosting chopper is stopped. However, even if there is a fluctuation of the power supply voltage, the motor is controlled so as to follow the speed command because the induced voltage of the motor has risen, the speed feedback control has been established and the pulse width of the PWM for maintaining that speed is attained. It is noted that when the PAM is turned off to lower the voltage, while the inverter controls the motor so that the speed command is attained by increasing the pulse width, the lowest speed is selected such that the conduction ratio becomes 100% when the voltage is the lowest in the fluctuation width of the AC power supply voltage.

Here, a quick freezing operation, a quick ice-making operation and a save operation will be explained. The home freezing performance of a household refrigerator makes it possible to suppress the growth of ice crystals within the cellular structures during freezing, to suppress the effluence of fluid from food (juice containing flavors and nutrition) during defrosting due to the destruction of cells in the food and to freeze with a high grade by minimizing the time of passing a maximum ice crystal produced zone (−1° C. to −5° C.) where most of the moisture in foods is frozen. In order to realize that, a quick freezing button (quick ice-making button) 134 is provided on a door of the refrigerator so that the quick freezing button (quick ice-making) operation is started when the button 134 is pressed. Beside the one provided on the door of the refrigerator, the quick freezing button 134 may be a relay contact or an electronic switch which may be closed by a remote controller.

When the quick freezing button 134 is pressed, a timer within a quenching circuit 133 is activated and the quick freezing operation of two hours at most is conducted until the quick freezing button 134 is manually released or the timer turns off. The quenching circuit 133 sends a speed command for setting the rotating speed of the motor at 4,200 turns/minute (fixed) to a selecting circuit 137. The selecting circuit 137 selects the speed command from the quenching circuit 133 and outputs it to a comparator 104. When the speed command of the motor is fixed, the deviation of the temperature may become large returning it, so that a temperature command is set at a value lower than the normal one by −7° C. Therefore, the temperature command is set by adding −7° C. to an output from a temperature setting device 130 by an adder 135. The deviation of this temperature and the actual temperature is outputted from a comparator 100. Taking in this temperature deviation, the quenching circuit 133 prevents the refrigerator and vegetable compartments, other than the freezer compartment, from being overcooled when the freezer temperature becomes lower than the preset freezer temperature (normally −18° C.) by 7° C. during the quick freezing operation by setting the speed command from the fixed value of the motor 4,200 turns/min. to 1 turns/min. When the freezer temperature rises and exceeds the preset temperature which is lower than the normal temperature by 7° C. (by having hysteresis), the quenching circuit 133 issues the speed command of the motor again to start the quick freezing operation. This action is repeated until the timer is turned off.

The quick freezing (ice-making) operation described above has made it possible to shorten the maximum time of passing the ice crystal generating zone to 30 minutes or less, thereby to freeze products with a high quality.

Energy-saving in a refrigerator has been advocated lately from governmental demands as a measure for preventing global warming. In order to respond to this demand, according to the present embodiment, a save button 132 is provided on the door of the refrigerator to realize an energy-saving mode.

When the save button 132 is pressed, the saving operation circuit 131 is activated. In order to raise the preset temperature (temperature command) by 1° C., the saving operation circuit 131 outputs a signal for adding 1° C. to the output of the temperature setting device 130. An adder 135 does the adding and an output of the adder 135 is set as a temperature command during the save operation. Saving operation circuit 131 also outputs a signal to a speed command limiter 136 so that no speed command of 3,000 turns/min. or more is outputted to the rear stage even if the speed command at the output of the speed command generator 101 exceeds 3,000 turns/min. Thus, the temperature deviation is reduced by raising the preset temperature. Therefore, the low voltage of the DC stage voltage of the main circuit is more likely to be selected and the pulse width of the inverter PWM waveform is increased, the iron loss of the motor is reduced and the power consumption may be reduced as described before. Further, because the DC stage voltage can be controlled, the operable minimum rotating speed may be set between 1,600 turns/min. to 2,000 turns/min. Therefore, the rotating speed of the motor will not be increased unnecessarily even though the temperature deviation is small, so that the power consumption may be reduced. Still more, the maximum speed is suppressed to 3,000 turns/min., even when the temperature deviation is very large, so that the rotating speed will not become high unnecessarily and the power consumption may be reduced when this save button 132 has been pressed.

By the way, saving operation circuit 131 takes in the output of the freezer temperature detector 138 and releases the save control by detecting when the temperature of the freezer compartment exceeds −10° C. When the load is so large that the intra-freezing temperature rises even if the operation is continued at the rotating speed of the motor of 3,000 turns/min., the saving operation circuit 131 releases the save operation to return to the normal operation and to cool the compartment to keep the temperature of the foods stored in the compartment at an adequate temperature.

It is noted that because the quick freezing operation is not compatible with the save operation, the system operates such that one of the operations is nullified even when the button of one operation is pressed during the time when the other button of the other operation is operative.

Figure 3:
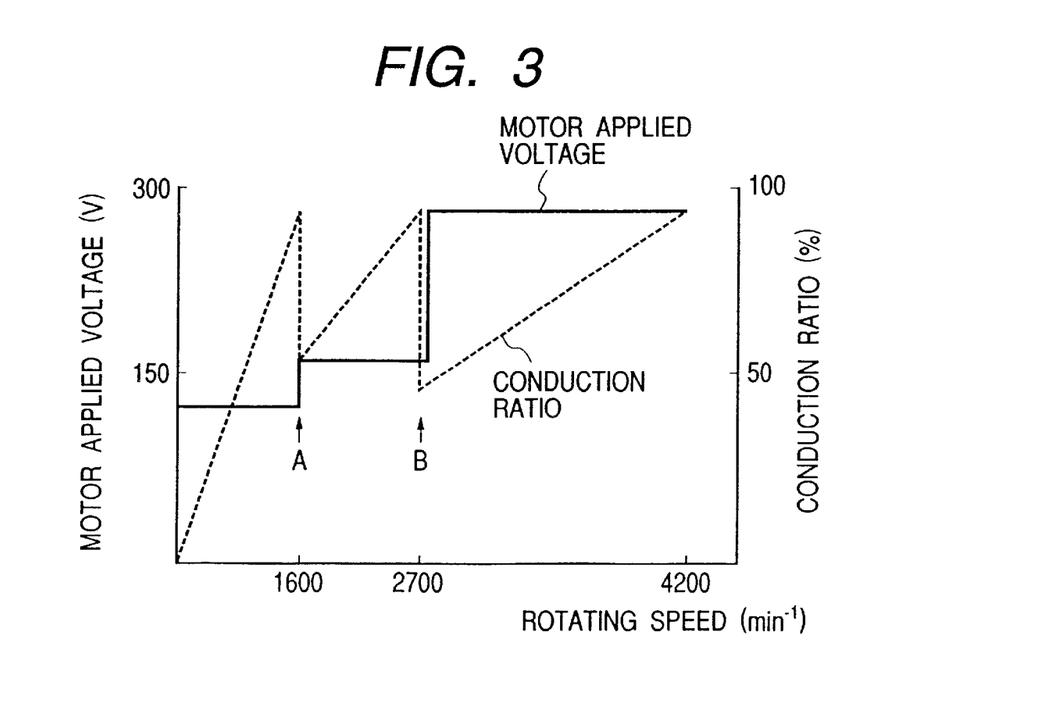
FIG. 3 is a graph showing the characteristics of motor applied voltage and a conduction ratio versus rotating speed.

Next, the operations for switching the DC voltage and for turning on/off the converter will be explained by reference to FIG. 3. FIG. 3 is a graph in which the horizontal axis represents the rotating speed of the compressor motor and the vertical axis represents voltage applied to the motor and the conduction ratio. FIG. 3 shows a case when the load is constant.

A speed command is large and actual speed is also large in a state in which the refrigerator compartments are not cool even though the compressor is operative because the temperature difference is large. While a command is issued for setting the DC voltage to a high voltage based on the both of them, this signal initially is 0 V and is outputted to the time constant circuit. The partial potentials across the resistors R2 and R3 are supplied to the converter control circuit side and the DC voltage is set at the high voltage of 280 V, for example. The motor 4 is controlled at high speed when the DC voltage is 280 V. While a variable width of the rotating speed is controlled within a range of 2,700 turns to 4,200 turns, the drive signal is created on the inverter control circuit side based on the conduction ratio signal from the deviation of the speed as described above to drive the switching elements, e.g., the transistors, of the inverter 3 to control the speed of the motor 4. The conduction ratio corresponding to the variable width of the rotating speed is controlled within a range of 45% to 95% for example.

When the compartment of the refrigerator is cooled down and the temperature thereof approaches the preset temperature, the rotating speed of the compressor motor 4 drops. When the command of the rotating speed of the motor 4 is less than 2,700 turns for example and the actual rotating speed also falls below 2,700 turns (the conduction ratio is 4.5% or less for example when the value of command is decided by the conduction ratio to the switching element of the inverter 3), the output to the time constant circuit is set to HIGH, and the resistors R3 and R4 are connected in parallel to change the value of the partial potential and to set the DC voltage to the intermediate voltage of 170 V (point B). At this time, the conduction ratio becomes 95% for example.

Here, since the product of the DC voltage and the conduction ratio must coincide before and after the switching, it is necessary to set the conduction ratio at a value not exceeding 100% when the DC voltage is lowered. The variable width of the rotating speed is controlled within a range of 1,600 to 2,700 turns and the conduction ratio is 55% for example when the rotating speed is 1,600 turns.

When the compartment of the refrigerator is cooled down further and the temperature thereof approaches the preset temperature, the rotating speed of the motor 7 is set at the lowest rotating speed of 1,600 turns for example. When the conduction ratio to the switching element of the inverter 3 falls below 55% for example of the command of the rotating speed of the motor 7 is 1,600 turns which is the lowest rotating speed and the actual rotating speed is also 1,600 turns, the control of the converter control circuit inside is turned off to set at the low voltage (point A). This control is made by the converter operation judging device 107 described above. Here, the conduction ratio must be set at a value not exceeding 100% when the DC voltage is lowered. It is noted that the control of the converter control circuit side may be turned off also when the rotating speed of the compressor motor 7 is not lowest.

The values of the conduction ratio and the rotating speed are values for accommodation of explanation. The speed of the motor may be controlled by lowering the DC voltage as the rotating speed of the compressor motor 7 decelerates by repeating the above-mentioned actions.

Next, a case when the compressor motor 7 is accelerated in contrast to what is described above will be explained. When the intra-compartment temperature rises as the door of the refrigerator is opened or warm foods are put into the compartment when the motor 7 is at the lowest rotating speed, then the rotating speed command of the motor 7 exceeds the lowest rotating speed for example and the actual rotating speed also exceeds the lowest rotating speed (the conduction ratio is 55% or more for example when the DC voltage command is switched by taking the conduction ratio to the switching element of the inverter 3 into consideration) in contrast to what is described above. In such a case, the control of the converter control circuit side is turned on (point A) to set the DC voltage at the intermediate voltage of 170 V for example.

The rotating speed of the motor 7 may be increased further by setting the DC voltage command given to the time constant circuit at 0 V to change to the value of the partial potentials of R2 and R3 and by setting the DC voltage at the high voltage of 280 V for example.

It is noted that it is necessary to provide hysteresis to the rotating speed in accelerating and decelerating the motor 7 to suppress hunting of the rotating speed in switching the DC voltage.

Further, although the switching of the DC voltage is performed in three stages including the control on and off of the converter in the present embodiment, the number of switching stages may be increased by proving a plurality of preset voltages in the DC voltage switching circuit 9.

Figure 5:
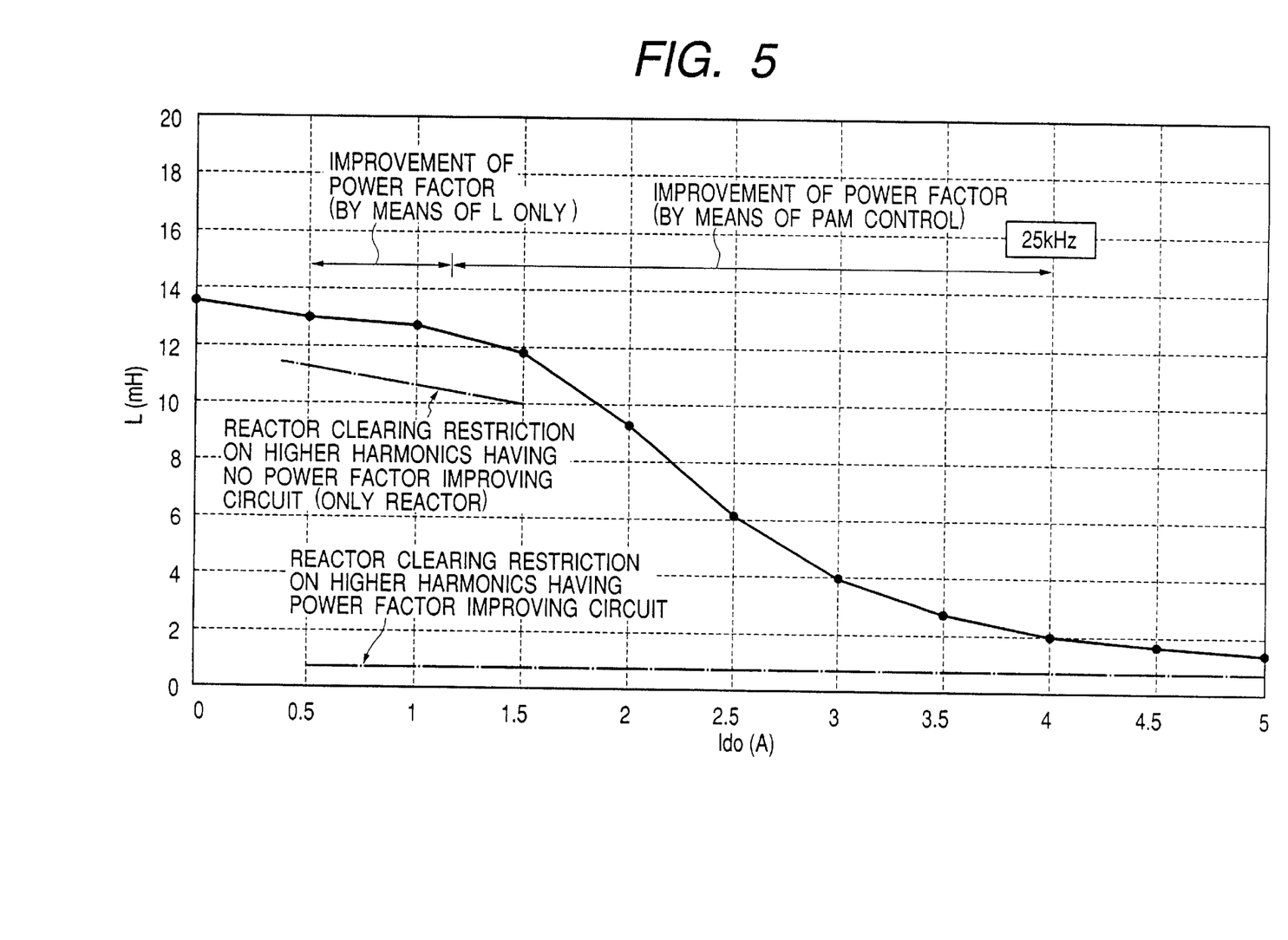
FIG. 5 is a graph showing the characteristics of a reactor of a converter circuit.

FIG. 5 shows the reactor characteristic of the converter circuit 2. When the compartment of the refrigerator is cooled and the temperature thereof approaches the preset temperature, the rotating speed of the motor 4 set at the lowest rotating speed and the control of the converter control circuit side (boosting chopper 27) is turned off. However, there is a problem in that a value for restricting the refrigerator cannot be satisfied at this time. The value of the reactor 25 may be around 1 mH when the DC voltage is controlled to improve the power factor through the boosting chopper 27 across the whole control range of the rotating speed of the motor 7 whose guideline on the restriction of the higher harmonics in the refrigerator is Class D. However, the value of the reactor 25 must be 10 mH or more to satisfy the higher harmonics guideline by turning off the boosting chopper 27. Therefore, the reactor 25 is arranged to have a characteristic of 10 mH or more during the low input (low current) when the boosting chopper 27 is turned off and a characteristic of around 1 mH during the high input (high current) when the boosting chipper 27 is turned on as described above. Thereby, the higher harmonics guideline may be satisfied even when the boosting chopper 27 is turned off.

Figure 6:
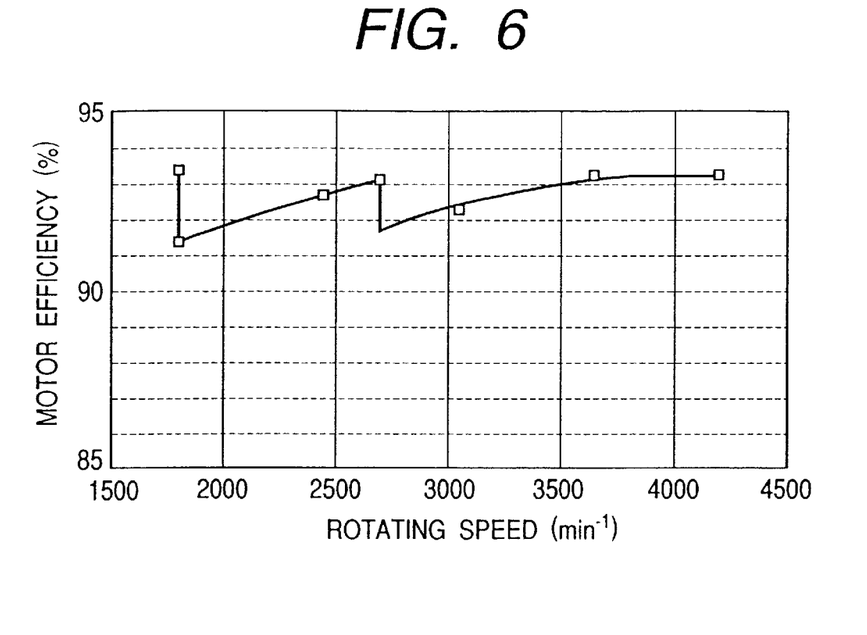
FIG. 6 is a graph showing the motor efficiency when DC voltage switching and converter control are turned off.
Figure 7:
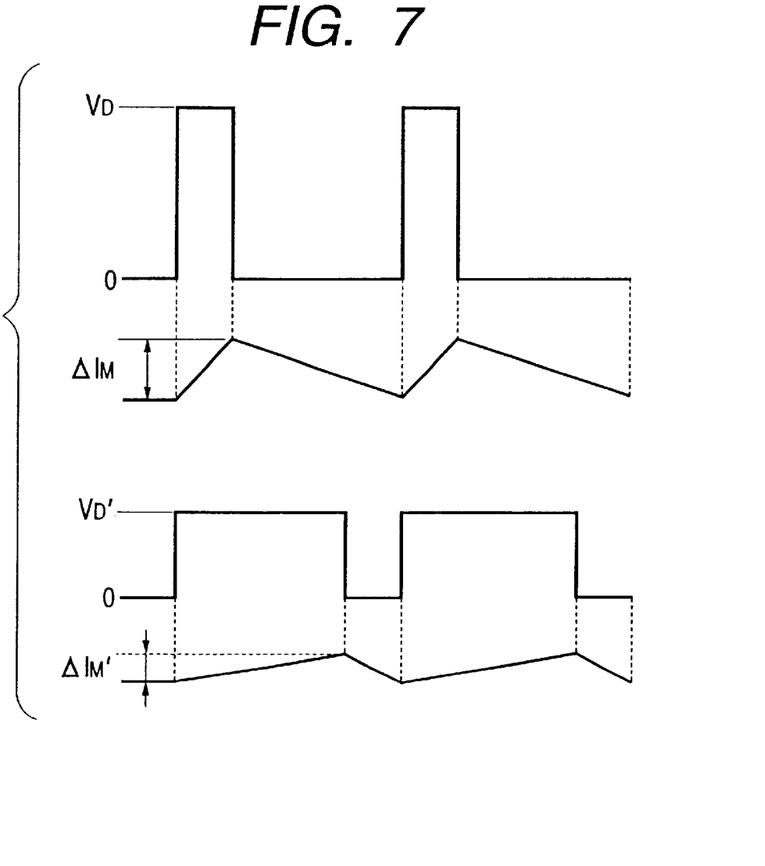
FIG. 7 is a waveform chart showing currents when the pulse width is changed in the course of modulating the pulse width.

FIG. 6 shows the efficiency of the motor in switching the DC voltage or when the boosting chopper 27 is turned off at the lowest rotating speed. When the rotating speed of the motor 7 is switched at 2,700 turns, the DC voltage drops from 280 V to 170 V, so that the efficiency of the motor improves by about 1 to 2%. It happens because the DC voltage drops, the conduction ratio of the inverter 3 increases and the iron loss caused by the chopper and lost in the motor decreases. Further, when the converter control is turned off, the DC voltage drops from 170 V to 120 V, so that the efficiency of the motor improves by about 2%. The reason for this will be explained with reference to FIG. 7. The upper part of FIG. 7 shows a PWM waveform of the switching element of the inverter 3 when the DC stage voltage is high. The motor current from the capacitor 5 flows when the switching element is ON. It circulates and attenuates via the circulating diode when the switching element is turned off. The peak-to-peak is assumed to be ΔAIM. In the same manner, the lower part FIG. 7 shows the waveform when the DC stage voltage is decreased to have the same conduction ratio by which the same voltage as shown in the upper part in FIG. 7 is applied to the motor 7. Because the DC stage voltage is low at this time and the current rising rate is small even when the switching element is turned on, ΔIM is small as compared to that shown in the upper part of FIG. 7. This ΔIM represents the pulsating flux density of the motor and means that the smaller the value, the smaller will be the iron loss of the motor. Accordingly, the greater the conduction ratio, the better the efficiency of the motor is.

Figure 8:
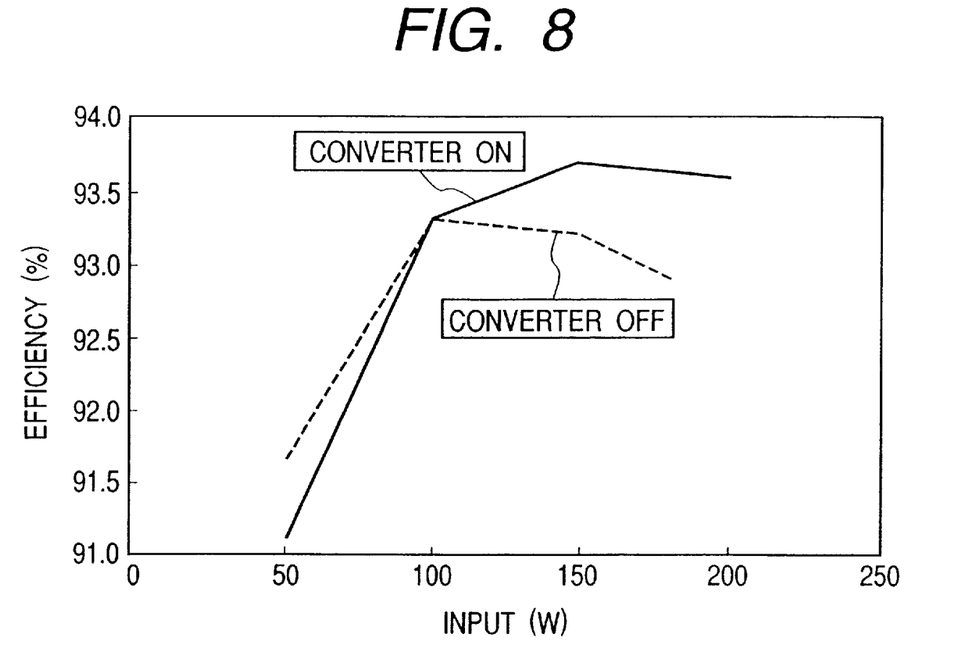

FIG. 8 is a graph showing the efficiency of the control circuit when the converter control is turned off and on. When the input (current) is lowered, the efficiency of the control circuit is improved by turning off the converter control because the switching loss of the switching element composing the boosting chopper is eliminated. Accordingly, the efficiency of the system may be improved by turning off the control of the converter when the input at the lowest rotating speed is small similar to the compressor motor 7.

While the embodiment described above has been explained with reference to various numerical values, those numerical values are just examples and other numerical values may be adopted as long as they confirm to the concept of the desired control.

Further, while the embodiment described above has been explained by reference to a control block diagram to facilitate its understanding, the comparator 100, the speed command generator 101, the position detector 102, the speed calculator 103, the comparator 104, the inverter PWM duty command generator 105, the circuit for computing the voltage command of the converter PAM voltage command generator 106, the converter operating judging device 107, the commutation output device 108, the AND circuit 109, the driver, the over-current protecting circuit 111, saving operation circuit 131, the quenching circuit 133, the adder 135, the speed command limiter 136 and the selecting circuit 137 may be realized by software. It is also possible to form these elements into an LSI by adding an inverter to them.

The embodiment described above brings about the following effects. The energy saving factor of the system may be realized by designing the compressor motor with emphasis on the point where it is utilized most (at the point of time of the lowest rotating speed) because the motor can be highly efficient. When the load of the refrigerator is high, the compressor motor may be operated at high speed because the DC voltage is increased by the DC voltage control circuit as described above. Still more, because the DC voltage drops from 280 V to 170 V when the rotating speed of the compressor motor 7 is switched to 2,700 turns, the efficiency of the motor is improved by 1 to 2%. When the converter control is turned off, the DC voltage drops from 170 V to 120 V. Accordingly, the efficiency of the motor improves by about 2%, thus saving energy further. Still more, the efficiency of the control circuit is also improved by turning off the converter control because the switching loss of the power element may be eliminated.

Next, an outline of the refrigerator will be explained with reference to FIG. 10. In the figure, the reference numeral (301) denotes an automatic ice maker, (302) denotes an ice cube tray, (303) denotes an ice-making tray temperature detecting sensor, (304) denotes a water supply unit, (305) denotes a water supply tank, (306) denotes an ice storage box, (307) denotes a ice detecting lever for detecting an amount of ice in the ice storage box 306, (308) denotes an evaporator, (309) denotes a defrosting heater provided around the evaporator to remove frost adhering on the evaporator, (310) denotes a intra-compartment cooling air circulating fan for circulating cooling air within the compartment, (311) denotes an intra-compartment cooling air circulating fan motor for driving the intra-compartment cooling air circulating fan, (312) denotes a controller as shown in FIG. 1, (134) denotes a quick ice-making (quick freezing) switch as means for starting an commanding the quick ice-making function (provided in the controller 312) for quickening ice-making time more than that during the normal operation, (4) denotes a power compressor containing the motor which is a rotating driving apparatus, (315) denotes a refrigerator compartment, (316) denotes an independent ice-making compartment or an ice-making corner, and (317) denotes a freezer compartment.

Figure 10:
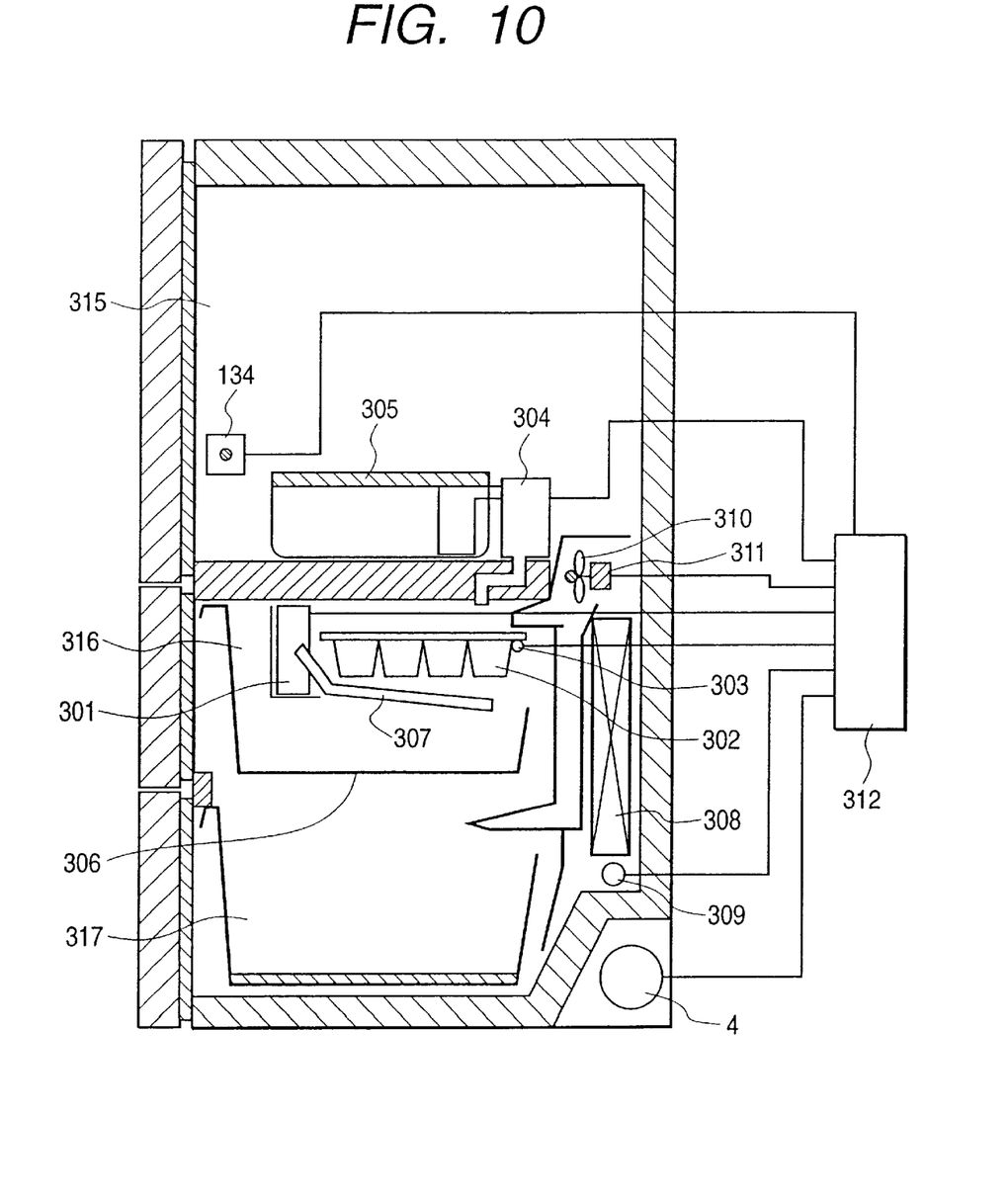
FIG. 10 is a longitudinal section view schematically illustrating the structure of the freezer-refrigerator according an embodiment of the invention.

It is noted that although the above-mentioned quick ice-making switch 134 is provided within the refrigerator compartment 315 in FIG. 10 for the purpose of explanation, the present invention is not confined only to that case, and the switch may be fixed on the door of the refrigerator or the outer surface of the main body. It is also noted that the save switch 132 is not shown in the figure.

In a refrigerator having the structure as described above, the quick ice-making function varies the operational rotating speed of the power compressor 4 and the intra-compartment cooling air circulating fan motor 311. Thus, it increases the freezing capability of the freezing cycle and the air amount supplied to the automatic ice maker 301 temporarily to quicken the ice-making time within the freezer compartment 317.

It is noted that according to the present embodiment, the operational rotating speed of the power compressor 4 is controlled variably by combining the PWM (pulse width modulation) control in the inverter circuit and the PAM (pulse amplitude modulation) control of the converter circuit for example. As a specific method, the rotating speed of the compressor is controlled by setting the DC voltage to a low voltage, e.g., 140 V, by the PAM control in the low speed range which is normally used in the refrigerator and the specified rotating speed of the compressor is stabilized by the PWM control of the inverter circuit.

Then, the DC voltage is set at a high voltage, e.g., 280 V, by the pulse voltage amplitude control during the quick ice-making operation and the specified rotating speed of the compressor is stabilized by the PWM control of the inverter circuit.

As another method, it is possible to implement the above-mentioned PWM control of the motor by the PWM and PAM control in the First Document and just to boost the DC voltage by the pulse voltage amplitude control to the DC voltage, e.g., 250 V, for reaching the specified rotating speed of the compressor during quick ice-making operation. In this case, the PWM control circuit of the inverter is not implemented because the specified rotating speed of the compressor is stabilized by the pulse voltage amplitude control (the inverter outputs one pulse of conduction of 120°).

Figure 11:
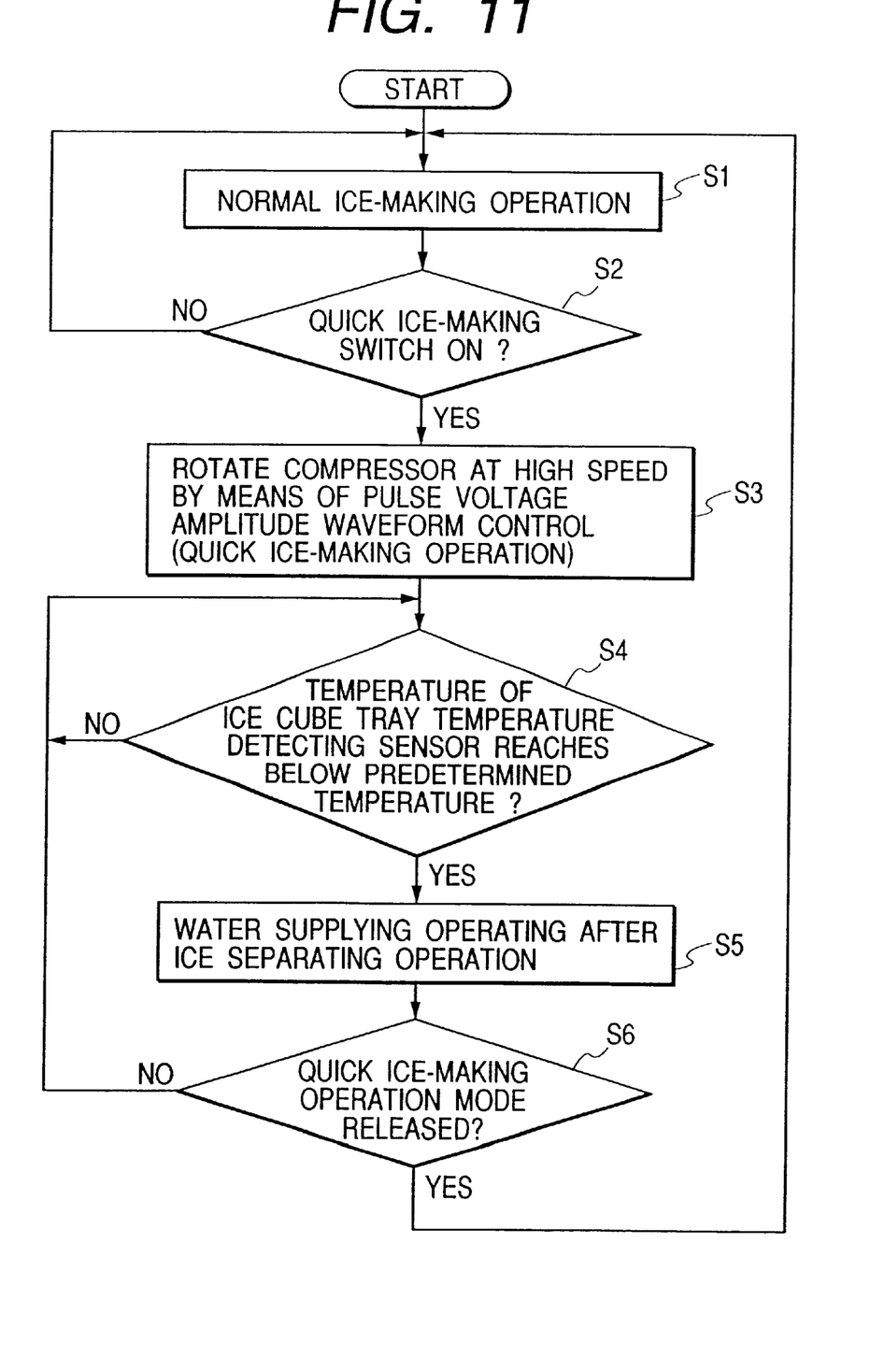
FIG. 11 is a flowchart for explaining ice-making control of the freezer-refrigerator of the embodiment.

FIG. 11 is a flowchart of the control provided for quick ice-making operation. In the figure, a process of a normal ice-making operation is carried out in Step 1 at first. Then, it is judged whether or not the quick ice-making switch 134 is turned on in Step 2. When it is judged that the quick ice-making switch 134 is turned on (Y) here, the process advances to Step 3 to start the quick ice-making operation by increasing the rotating speed of the compressor to more than that of the normal operational rotating speed of the compressor using the high and low levels of the DC voltage applied to the power compressor 4, i.e., by the above-mentioned pulse voltage amplitude control (PAM control). It is noted that when it is judged that the quick ice-making switch is not on (N) in Step 2, the process returns to Step 1 again.

Next, it is monitored whether or not the detected temperature of the ice cube tray temperature detecting sensor 303 has reached a temperature below a predetermined temperature (which is set at temperature by which water supplied to the ice cube tray 302 is completely frozen) in Step 4. When it is judged that the temperature detected by the sensor is below the predetermined temperature (Y), the process advances to Step 5 and the automatic ice maker 301 performs an ice separating operation and then a water supplying operation. Next, it is judged whether or not the quick ice-making operation mode has been released in Step 6. When it is judged that the quick ice-making operation mode has been released (Y), the process returns to Step 1 again. When it is judged that the quick ice-making operation mode has not been released (N) in Step 6, the flow returns to Step 4 again. In Step 4, the judging operation is repeated until it is judged that the detected temperature of the ice cube tray temperature detecting sensor 303 is below the predetermined temperature.

As described above, the controller 312 is provided with a function (pulse voltage amplitude control) for controlling the operational rotating speed of the power compressor 4 by switching the DC voltage applied to the compressor motor 7 stepwise so that the operational rotating speed of the power compressor 4 of the refrigerator becomes faster than that during normal operation by turning on the quick ice-making switch 134.

Thereby, when there is no ice in the ice storage box 306 when ice is necessary or when a large amount of ice is necessary, the cooling capacity is enhanced by raising the rotating speed of the power compressor 4 (quick ice-making operation) and the ice-making time of one time is cut into a half of the time used in the past (about 0.5 to 1 hour). Because the power compressor 4 operates a predetermined high speed when the quick ice-making switch 134 is on, the ice-making time of one time is not fluctuated by the load (outside air temperature, door opening/closing frequency, amount of load within the compartment) applied normally to the refrigerator. Therefore, the ice-making capability will not drop, no enormous amount of time will be necessary and the fluctuation of ice-making time per one time may be reduced even in a plurality of ice-making operations. The other functions of the quick ice-making switch 134 are the same as those which have been described with reference to FIG. 1.

Even when it is compared with the case of the PWM control described above, it is also not necessary to design the motor for rotating and driving the compressor which is rotated at high speed in conformity with the high speed range, the efficiency at the low speed range may be highly maintained and energy saving may be realized by switching the DC voltage applied to the power compressor 4 stepwise, i.e., by controlling the operation rotating speed thereof by pulse voltage amplitude (PAM) control.

Figure 12:
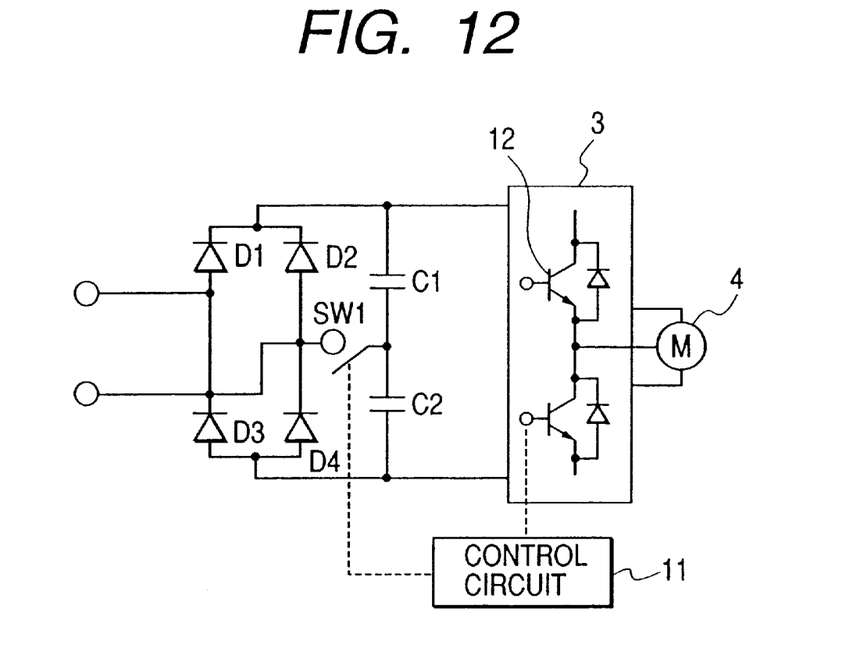
FIG. 12 is a circuit diagram showing the structure of circuits for switching over between full-wave rectification and double voltage rectification.

FIG. 12 shows the structure of circuits switching over full-wave rectification to double voltage rectification and another method for switching the DC voltage. A power circuit of the inverter circuit 3 comprises rectifier diodes D1, D2, D3 and D4, smoothing capacitors C1 and C2 and a switch SW1. The switch SW1 is controlled by a control circuit 11 composed of a microcomputer and other elements. The full wave rectifying circuit is formed when the switch SW1 is OFF and the voltage double rectifying and switching circuit is formed when it is ON. The DC voltage obtained by rectifying and smoothing the commercial power source using the full wave rectifying circuit and the voltage double rectifying and switching circuit is applied to the switching element of the inverter circuit 3 to drive the motor 7.

Figure 13:
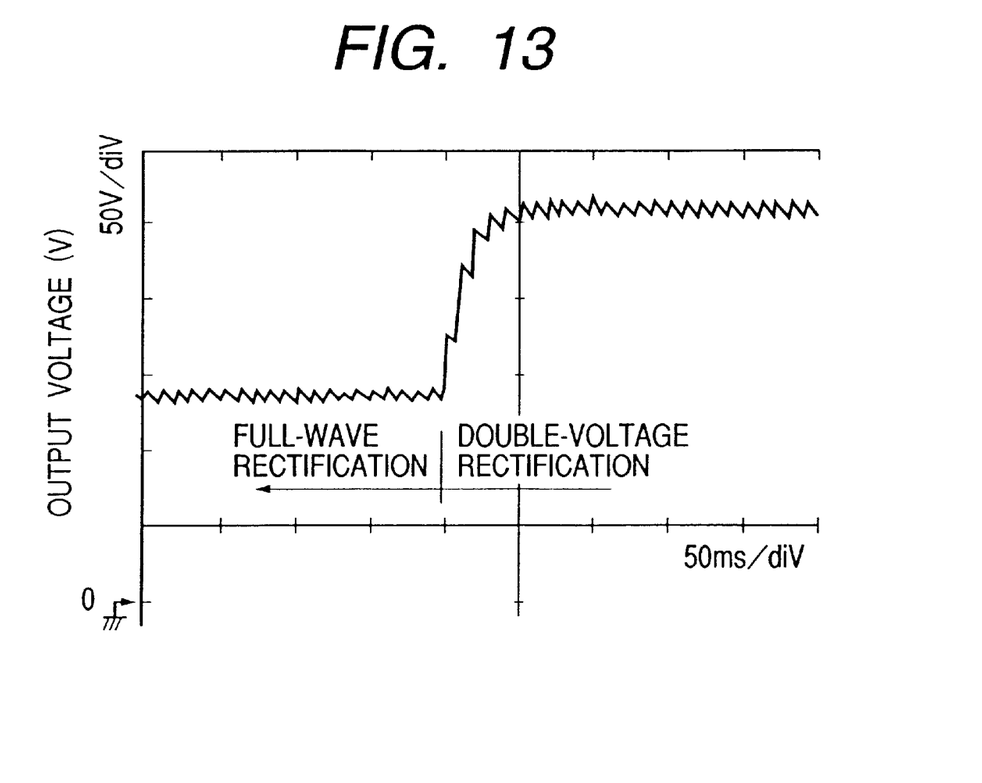
FIG. 13 is a characteristic diagram showing the DC voltage characteristics in switching from the full-wave rectification to the double voltage rectification.

FIG. 13 shows characteristics of the DC voltage in switching from the full wave rectification to the double voltage rectification. The DC voltage characteristics shown here is when the switch SW1 is set as a relay. Therefore, the time when the DC voltage rises in switching from the full wave rectifying circuit to the voltage double rectifying and switching circuit is around 50 ms. During this 50 ms, the control circuit 11 controls the conduction ratio of the voltage to be applied to the compressor motor 7 so that the preset rotation speed is attained. The rising speed of the DC voltage may be varied arbitrarily when the switch SW1 is a semiconductor by controlling the ON/OFF timing of the switch for switching from the full wave rectifying circuit to the voltage doubler rectifying and switching circuit causing the control circuit 11.

It is noted that the ripple of the DC voltage shown in FIG. 13 is determined by the capacity of the smoothing capacitors C1 and C2. Therefore, the ripple voltage may be reduced by increasing the capacity of the smoothing capacitors C1 and C2.

As described above, the invention brings about the effects of reducing the ice-making time considerably and of providing a refrigerator whose power consumption may be reduced because the efficiency of the motor is enhanced by an energy saving mode.

While the preferred embodiments have been described, variations thereto will occur to those skilled in the art within the scope of the present inventive concepts which are delineated by the following claims.

What is claimed is:

1. A refrigerator, comprising:
   motor for driving a compressor;
   an inverter for controlling the operation of said motor;
   a converter responsive to AC to perform a boosting function to supply DC of variable voltage to said inverter;
   converter control means for controlling said converter so that a plurality of DC voltages are outputted thereby; and
   inverter control means for controlling said inverter in pulse width modulation each of said plurality of voltages;
   the lowest voltage among said plurality of voltages being a voltage which turns off the boosting function of said converter.

2. A refrigerator, comprising:
   motor for driving a compressor;
   an inverter for controlling the operation of said motor;
   a converter having a rectifier circuit for converting AC to DC and a boosting circuit for boosting a DC voltage and supplying the DC to said inverter;
   boosting circuit control means for controlling said boosting circuit so that said converter can output a plurality of DC voltages; and
   inverter control means for controlling said inverter using pulse width modulation of each of said plurality of voltages;
   the lowest voltage among said plurality of voltages being an output voltage of the rectifier circuit of said converter.

3. A refrigerator, comprising:
   a rectifier circuit for converting AC into DC;
   a boosting chopper for boosting said DC;
   a reactor provided between said rectifier circuit and said boosting chopper;
   an inverter provided behind said boosting chopper for converting DC to AC;
   a motor which is controlled by said inverter and which drives a compressor;
   boosting chopper control means for controlling said boosting chopper so that the DC inputted to said inverter becomes DC of a plurality of kinds; and
   inverter control means for controlling said inverter using the pulse width modulation of each of the plurality of types of DC voltages;
   said reactor presenting a large inductance in a small current range and a small inductance in a large current range.

4. The refrigerator according to claim 3, wherein said reactor comprises coils wound around a ringed core having at least one gap.

5. A refrigerator, comprising:
   motor for driving a compressor;
   an inverter for controlling said motor;
   a converter having a rectifier circuit for converting AC to DC and a boosting circuit for boosting a DC voltage and supplying DC to said inverter;
   boosting circuit control means for controlling said boosting circuit so that said converter can output a plurality of DC voltages; and
   inverter control means for controlling said inverter using pulse width modulation of each of said plurality of voltages;
   said refrigerator further comprising;
   first operating means for operating said motor in a speed range which is lower than a first rotating speed;
   second operating means for driving said motor at a second speed which is greater than said first rotating speed;
   wherein said plurality of DC voltages comprise three stages of voltages representing high, intermediate and low voltages;
   said boosting chopper control means being arranged so that the three stages of high, middle and low voltages are selected corresponding to the rotating speed of said motor, said high voltage being selected when said second operating means is selected.

6. A refrigerator, comprising:

a motor for driving a compressor;

an inverter for controlling operation of said motor;

a converter having a rectifier circuit for converting AC to DC and a boosting circuit for boosting a DC voltage and supplying DC to said inverter;

boosting circuit control means for controlling said boosting circuit so that said converter can output a plurality of DC voltages; and inverter control means for controlling said inverter using pulse width modulation of each of said plurality of voltages; wherein said plurality of DC voltages are selected based on a rotating speed command of said motor and an actual speed of rotation thereof.

7. A refrigerator, comprising:

motor for driving a compressor;

an inverter for controlling said motor;

a converter responsive to AC for supplying DC of variable voltage to said inverter;

said refrigerator further comprising:

means for setting the DC voltage supplied to said inverter at a value higher than the value converted from AC to DC.

8. A refrigerator, comprising:

motor for driving a compressor;

an inverter for controlling said motor;

a converter responsive to AC for supplying DC of variable voltage to said inverter;

said refrigerator further comprising:

means for driving said motor at a voltage which is lower than said DC voltage at the time of starting of said motor.

* * * * *